United States Patent

Tatuoka et al.

3,865,465

Feb. 11, 1975

[54] COMPENSATION SYSTEM FOR A POLYGONAL MIRROR SCANNING SYSTEM

[75] Inventors: Sizuo Tatuoka; Teiichi Taneda, both of Kawasaki; Meiki Aiko, Tokyo, all of Japan

[73] Assignee: Nippon Hoso Kyokai, Tokyo, Japan

[22] Filed: Mar. 19, 1973

[21] Appl. No.: 342,629

[30] Foreign Application Priority Data
Mar. 29, 1972 Japan.............................. 47-31303

[52] U.S. Cl....................... 350/7, 178/7.6, 350/190
[51] Int. Cl. ............................................ G02b 17/00
[58] Field of Search................................ 350/6, 7, 190

[56] References Cited
UNITED STATES PATENTS

| | | | |
|---|---|---|---|
| 2,543,463 | 2/1951 | Malm | 350/6 UX |
| 3,641,513 | 2/1972 | Picquendar et al. | 350/190 UX |
| 3,750,189 | 7/1973 | Fleischer | 350/7 X |

*Primary Examiner*—Ronald L. Wibert
*Assistant Examiner*—Matthew W. Koren
*Attorney, Agent, or Firm*—Stevens, Davis, Miller & Mosher

[57] ABSTRACT

A compensation system for a light beam scanning system having a polygonal mirror comprising simple optical systems, each of which focuses in one azimuth direction, such as a cylindrical lens, being inserted in both light paths of the incident and reflective sides of the reflection or deflection point of the polygonal mirror, to one another, and being arranged so as to converge the output light beam from said optical systems in the direction perpendicular to the scanning direction of said light beam in such a way that the light beam has an elliptical section at said deflection point of said polygonal mirror, even if the tilt of mirror surface to the rotating axis of said polygonal mirror occurs.

1 Claim, 6 Drawing Figures

*PRIOR ART*

COMPENSATION SYSTEM FOR A POLYGONAL MIRROR SCANNING SYSTEM

BACKGROUND OF THE INVENTION

1. Field of the Invention:

This invention relates to a system for compensating deviation of scanning line deflected from a polygonal mirror scanner due to the tilt of mirror surface to the rotating axis of the polygonal mirror by arranging simple optical systems in the light paths of incident and exit light beams of said mirror.

2. Description of the Prior Art:

For a large screen colour television display system, some kinds of light valves, laser displays have been used, but it has not been easy to obtain a high quality picture. Among the above, laser display systems are considered to have an advantage in the resolution and the colour reproduction in principle. In these systems, in order to attain high quality display, a light beam scanner having a polygonal miorror which rotates around its rotating axis so as to deflect the incident light beam and to perform scanning is utilized, since such light beam scanner has many advantageous effects such as high speed scanning, high deflection resolution, no colour dispersion, and so on. This scanner is utilized not only in a laser display system but also in a film recording system, or a facsimile system.

In such known scanner, the light beam deflected by the rotating polygonal mirror is influenced by its mechanical deviations, for example, angular difference between any two mirror surfaces, tilt of mirror surface to rotating axis, surface roughness, flatness, relative difference of reflectivity, and relative difference of radius. Consequently, the beam obtained from the mirror is not only blurred but is also deviated from the correct scanning angle.

Among these deviations, angular difference between any two mirror surfaces ($\Delta\alpha$) and tilt of mirror surface to rotating axis ($\Delta\beta$) are most important problems. If a polygonal mirror having 25 mirror surfaces is used for horizontal scanning of the television system having 525 horizontal scanning lines, the ratio of the blanking period to the horizontal scanning period is 0.16, and the number of picture elements in horizontal direction is 400, then the angular difference between any two surfaces $\Delta\alpha$ is $\pm 27$ seconds of arc and corresponds to $\pm\frac{1}{4}$ picture element.

If the above-mentioned polygonal mirror scanner as the horizontal scanning unit is combined with the linear vertical scanning system such as a galvanometer, a raster can be displayed on a screen. In such a case, raster irregularity, i.e., non-uniformity of scanning line pitch is caused by the tilt of the mirror surfaces to the rotating axis ($\Delta\beta$), and consequently this tilt $\Delta\beta$ visually disturbs the displayed image and has undesired influence on image quality. Thus, it is necessary to eliminate this tilt $\Delta\beta$ in order that the raster irregularity cannot be visually noticed. The tolerance of the raster irregularity can be decided roughly by the following relation.

minimum scanning pitch/maximum scanning pitch $\geq$ 0.85

When calculating the tilt $\Delta\beta$ in case of this tilt being 0.85, $\Delta\beta$ becomes $\pm 2.5$ seconds of arc. As the result of this example, it is apparent that the requirement for $\Delta\beta$ is more severe than that for $\Delta\alpha$.

According to the present technique of manufacturing the polygonal mirror, $\Delta\beta$ is usually in the order of $\pm 10$ seconds of arc, and $\pm 2.5$ seconds of arc is the desired limit value of $\Delta\beta$.

In addition to the problem of accuracy of the polygonal mirror itself, if the polygonal mirror is mounted to a driving motor so as to rotate, $\Delta\beta$ increases equivalently, since the mirror and the rotor of the driving motor are not strictly co-axial.

Accordingly, it is necessary to compensate $\Delta\beta$ in the light beam scanner having the polygonal mirror.

In order to improve non-uniformity of scanning line pitch caused by the above-mentioned $\Delta\beta$, many methods are proposed, for example, compensation system having a light deflector with high deflection speed and small deflection angle which utilizes an electro-optical effect element. This compensation system, however, has drawbacks in that the light deflector is expensive and that means for controlling the driving of the light deflector is complicated.

SUMMARY OF THE INVENTION

The object of the present invention is to provide a compensation system for a polygonal mirror scanning system having an optical system which comprises simple optical systems, without using any mechanically active component, so as to substantially reduce the influence of $\Delta\beta$ zero in principle.

The compensation system according to the present invention comprises optical systems, each of which focuses in one azimuth direction, being inserted in both light paths of the incident and reflective sides of the reflection or deflection point of the rotating polygonal mirror of a light beam scanner, to one another, and being arranged so as to converge the output light beam of said optical system in the direction perpendicular to the scanning direction of said light beam in such a way that the light beam has an elliptical section at said reflection point of said polygonal mirror, whereby the light beam incides to the same position at a display screen, even if the tilt of the mirror surface to the rotating axis of said polygonal mirror occurs.

DESCRIPTION OF THE PREFERRED EMBODIMENTS

Figure 1A:
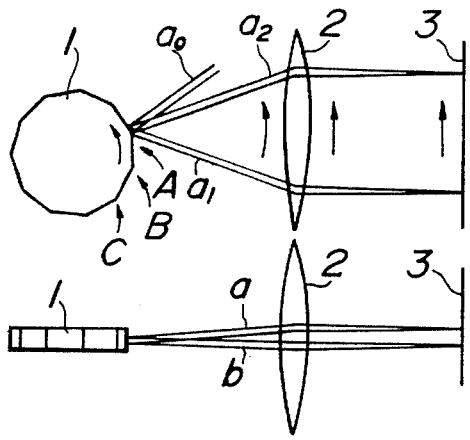
FIGS. 1a and 1b are a plan view and a side view, respectively, of the prior light beam scanner having a polygonal mirror and are for the purpose of explaining the defect of the position accuracy of the scanned light beam due to the tilt of the mirror surface to the rotating axis ($\Delta\beta$)
Figure 1B:
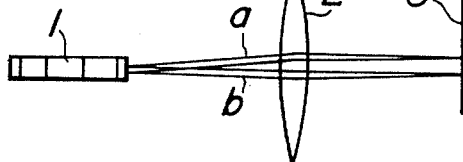

FIGS. 1a and 1b illustrate an outline of the light beam scanner having a polygonal mirror of the prior art. In FIGS. 1a and 1b, reference numerals 1, 2 and 3 denote a polygonal mirror, a converging lens and a screen, respectively.

As apparently shown in FIG. 1a, a parallel beam $a_0$ is incident to the polygonal mirror 1 and is reflected by the mirror surface A of said mirror 1. The reflected beam is deflected by the rotation of said mirror, i.e., this beam changes from the state $a_1$ to the state $a_2$. The beam thus deflected is converged to the screen 3 by the converging lens 2. Consequently, the converged light spot displays a scanning line on the screen 3. The position of the scanning line displayed on the screen 3 by each of the mirror surfaces A, B, C, . . . must be requested to be strictly coincident one another when the mirror surface deflecting the incident light beam is changing from A to B, from B to C, . . . .

In practice, however, the above-mentioned tilt $\Delta\beta$ cannot be negligible, so that the locus scanned by the reflected light beam $a$ at the mirror surface A is not coincident with that scanned by the reflected light beam $b$ at the mirror surface B and that accordingly the scanning positions corresponding to different mirror surfaces are different.

This drawback can be eliminated by a simple compensation system in accordance with the present invention which is inserted to the light path of the polygonal mirror scanner of the kind set forth.

Figure 2A:
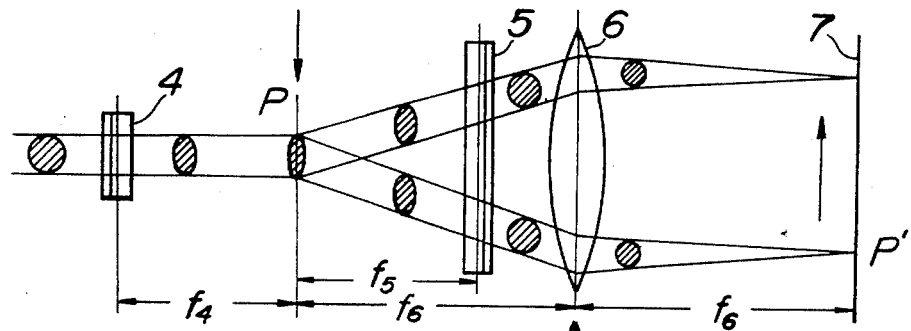
FIGS. 2a and 2b are a plan view and a side view, respectively, of one embodiment of the light beam scanner according to the present invention, showing in the form of developing straightly the light paths to and from the polygonal mirror.
Figure 2B:
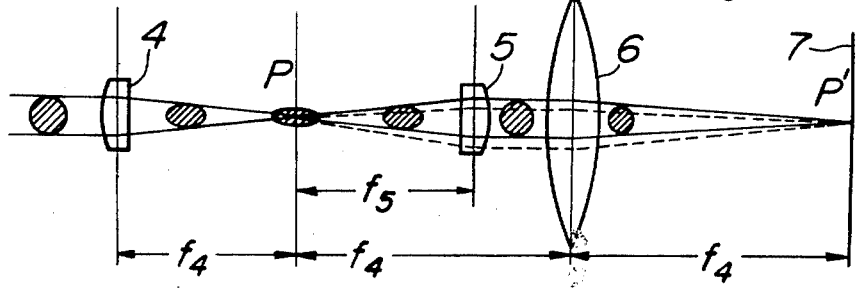

In FIGS. 2a and 2b, the light paths to and from the polygonal mirror are developed straightly so as to be coincident with each other, for purposes describing the principle of the present invention, and it is assumed that the light beam travels from the left side of these drawings to the right side thereof. In addition, the sectional shapes of the beam at many positions are shown at the corresponding positions in the light beam. The optical system shown in FIGS. 2a and 2b is coincident with the known optical system of FIGS. 1a and 1b, except for the provision of two optical systems, each of which focuses in one azimuth direction. In this embodiment of the present invention, these unidirectionally focussing optical systems are shown in the form of cylindrical lenses 4 and 5. But, these optical systems are not limited to cylindrical lenses and any optical systems can be employed so long as they focus in one azimuth direction.

Referring to FIGS. 2a and 2b, the principle of the present invention will be explained.

The convergence of the beam viewed from above FIGS. 2a is the same as that viewed from above FIG. 1a, since the cylindrical lenses 4 and 5 do not serve as lenses at all in the plane which includes a deflection point P and is parallel to the plane of FIG. 2a.

On the other hand, the beam in view of FIG. 2b is converged by the cylindrical lens 4 in the above plane and have minimum beam width at the deflection point P. The beam, after deflected at the point P, diverges to be incident into the other cylindrical lens 5. The beam obtained from the lens 5 is restored to the original parrallel beam.

Consequently, the light beam in the light path after the lens 5 has, as shown, a circular section as is the case of the optical system of FIGS. 1a and 1b. This light beam having a circular section is converged onto a screen 7 by a spherical converging lens 6.

In this embodiment, focal lengths $f_4$ and $f_5$ of the cylindrical lenses 4 and 5 are chosen to be equal to one another, and the cylindrical lenses 4 and 5 are so arranged that the distance between the cylindrical lens 4 and the deflection point P is chosen to be the focal length $f_4$, and that the distance between the deflection point P and the lens 5 is chosen to be the focal length $f_5$ ($=f_4$). For purposes of explanation, the distance between the deflection point P and the lens 6 is chosen to be equal to the focal length $f_6$ of the lens 6, and the distance between the lens 6 and the screen 7 is also chosen to be $f_6$.

In this optical system, so long as the light beam is viewed from the direction of FIG. 2b, the deflection point P and the converging point P′ on the screen 7 satisfy the relation between the object point and the image point. Accordingly, the point P′ is fixed at a constant position, even if the direction of the light beam diverged from the point P is varied. For instance, even if the light beam is deflected in a different manner as shown in dotted line due to the occurrence of the tilt $\Delta\beta$, the output beam from the cylindrical lens 6 can be converged onto the same point P′ on the screen 7.

Hence, the optical system thus arranged according to the present invention can completely eliminate only the deflection component due to the undesired tilt $\Delta\beta$, without any change of the desired condition of deflection.

In the aforementioned embodiment, the lens 6 is arranged at the distance $f_6$ from the deflection point P, but the location of the lens 6 is not limited to this position. The lens 6 can be suitably arranged in front of or at the back of this position. In such a case, the position of the screen also changes and the scanning width by the deflected light beam changes.

In the above embodiment of FIG. 2, it is necessary to insert the cylindrical lens 5 between the deflection point P and the spherical converging lens 6, so that the focal lengths $f_4$ and $f_5$ of the cylindrical lenses 4 and 5 must be fairly short. Due to these short focal lengths $f_4$ and $f_5$, the converging angle of the light beam at the deflection point P is large. In such a condition, the position of the deflection point P is required to be strictly fixed. In practice, however, the substantial radius of the polygonal mirror of the scanner varies in both cases when the reflection point of the light beam is positioned at the center of the mirror surface and when it is positioned at both ends of the mirror surface, so that it is not possible to completely satisfy the above condition.

Figures 3A, 3B:
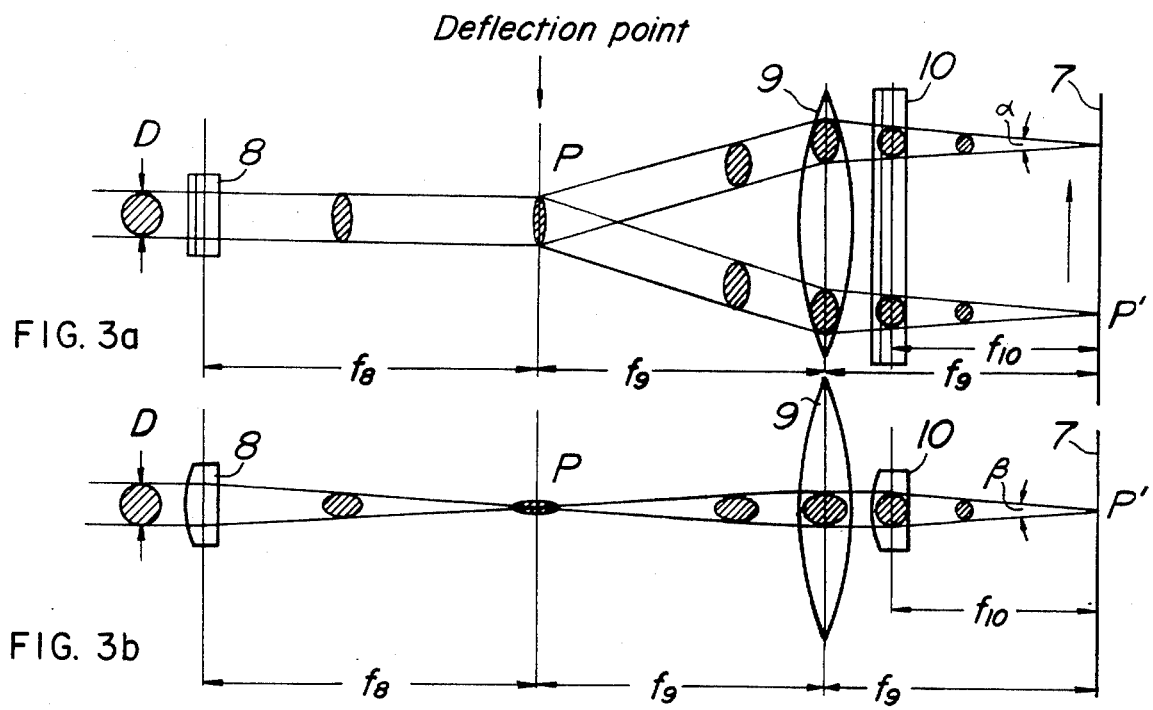
FIGS. 3a and 3b are a plan view and a side view, respectively, of another embodiment of the scanner according to the present invention in the same form as shown in FIGS. 2a and 2b.

In order to solve this problem, it is desired to make the focal length of the cylindrical lens 4 longer. For this purpose the embodiment of FIG. 2 can be improved to the embodiment of FIG. 3. In FIGS. 3a and 3b, the reference numerals 8 and 10 denote cylindrical lenses, respectively. The cylindrical lens 8 is arranged in front of the deflection point P, and the cylindrical lens 10 is arranged at the rear of a spherical lens 9 which converges the deflected light beam from the deflection point P. According to this arrangement, the focal length $f_8$ of the pre-arranged cylindrical lens 8 can be chosen to be long enough, so that the depth of focus at the deflection point P can be made deep. The reason will be explained as follows.

In FIGS. 3a and 3b, the focal lengths of lenses 8, 9 and 10 are shown as $f_8$, $f_9$ and $f_{10}$, the diameter of the incident light beam is assumed to be D, and the converging angles of the beam on the screen 7 are assumed to be $\alpha$ and $\beta$, in which $\alpha$ is a converging angle in the plane which includes a deflection point P and is parallel to the plane of FIG. 3a, and in which $\beta$ is another converging angle in the plane which includes a deflection point P and is parallel to the plane of FIG. 3b.

The converging angles $\alpha$ and $\beta$ are expressed as the following equations, respectively, in case of arranging each of the above optical components as shown in FIG. 3.

$$\alpha = D/f_9$$
$$\beta = f_9/f_8.f_{10}.D$$

The condition for $\alpha=\beta$ is obtained as follows.

$$f_9^2 = f_8 \cdot f_{10} \quad (1)$$

If the focal length $f_6$ of the spherical lens 6 shown in FIG. 2 is chosen to be equal to the facal length $f_9$ of the spherical lens 9 shown in FIG. 3, then $f_4$ has the following relation.

$$f_4 < f_6 = f_9 \quad (2)$$

The focal length $f_8$ of the cylindrical lens 8 is obtained from said equation (1) as follows.

$$f_8/f_9 = f_9/f_{10}$$

Accordingly, if $f_{10} < f_9$, then the following relation is obtained.

$$f_8 > f_9 \quad (3)$$

Hence, the following inequality is introduced from said relations (2) and (3).

$$f_8 > f_9 > f_4 \quad (4)$$

As clear from this inequality, the focal length $f_8$ can be chosen enough long in comparison with the focal length $f_4$.

In the above embodiments, the light beam at the light receiving plane, i.e., at the screen has a circular section, but the section of the light beam at the screen is not limited to be circular and can be elliptic by choosing the focal lengths of said cylindrical lenses to be different one another. In such a case, the width of raster can be varied by the optical system according to this invention.

In addition to the above embodiments of onedirectional or one-dimensional scanning, if two-dimensional raster is required in such cases as a laser display, laser film recording and so on, it is possible to compose twodimensional scanning system by adding a second one-dimensional scanning system, arranged to be perpendicular to the first one-dimensional scanning system, to said first scanning system. In such a two-dimensional scanning system, parallel screen 7 in FIGS. 2 and 3 is removed and thereafter arranged is a relay lens similar to the lens 6 so as to converge the image of said deflection point P to an image point at the exit side of said relay lens. This image point serves as a second deflection point and relating to this deflection point is provided a second one-directional scanning system. A two-dimensional raster can be obtained from this two-dimensional scanning system. In this case, the image obtained at the second deflection point and corresponding to the first deflection point P is not elliptical but circular by said cylindrical lens 5 or 10.

In accordance with the compensation system of the present invention, following advantageous effects can be attained.

1. By only providing two simple uni-directionally focussing optical systems such as two cylindrical lenses, the error of the location of scanning line due to the tilt $\Delta\beta$ can be substantially reduced to zero, without using any active element.
2. The compensation system according to this invention can be assembled to the polygonal mirror scanner more cheaply and more reliably compared to the prior known compensation system.
3. The shape of the spot on the screen can be varied, if desired, from circle to ellipse, by finely adjusting the location of the cylindrical lenses along optical axis. In this case, the shape of the received spot on the screen can be varied in a manner that the width of the spot in the direction perpendicular to the scanning direction without changing the width of the spot in the direction of scanning, so that the space between adjacent rasters can be reduced without lessening the horizontal resolution.

Although two embodiments of the present invention have been described, the present invention is not limited to the particular embodiments shown and many modifications and alternations are possible without departing from the scope of the present invention.

What is claimed is:

1. A compensation system for a light beam scanning system including a light source emitting a light beam, a polygonal mirror which rotates around its rotating axis so as to deflect an incident light beam emitted from the light source to scan a display screen along a scanning direction reflecting said light beam by said polygonal mirror and by focussing the reflected light beam by means of a converging lens having focal length $f_9$ on said display screen, the improvement comprising a first cylindrical lens means having focal length $f_8$ inserted in the incident light beam path between the light source and the polygonal mirror so as to focus the incident light beam in one azimuth direction to form a beam having an elliptical cross section whose major axis defines a line on the polygonal mirror extending in a direction which is perpendicular to said rotating axis, a second cylindrical lens means having focal length $f_{10}$ inserted in the reflected light beam path between the converging lens and the display screen so as to focus the reflected light beam in one azimuth direction to form a scan line on the display screen in a direction coincident with the scanning direction of the light beam, said second cylindrical lens means being arranged so as to converge the output light beam from said coverging lens in a direction perpendicular to the scanning direction of said light beam in such a way that the light beam has a circular cross section section between said second cylindrical lens and said display screen, and the ratio $(f_8/f_9)$ of the focal length $(f_8)$ of said first cylindrical lens means to the focal length $(f_9)$ of the converging lens is equal to that $(f_9/f_{10})$ of the focal length $(f_9)$ of said converging lens to the focal length $(f_{10})$ of said second cylindrical lens means, whereby the light beam is incident to the same position on the display screen even if the reflecting surface of the pologonal mirror and its rotating axis show imbalances.

* * * * *